United States Patent
Fuehrer

(10) Patent No.: US 9,257,046 B2
(45) Date of Patent: Feb. 9, 2016

(54) METHOD AND DEVICE FOR COOPERATIVELY BASED NAVIGATION

(71) Applicant: Thomas Fuehrer, Stuttgart-Weilimdorf (DE)

(72) Inventor: Thomas Fuehrer, Stuttgart-Weilimdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/377,913

(22) PCT Filed: Dec. 17, 2012

(86) PCT No.: PCT/EP2012/075769
§ 371 (c)(1),
(2) Date: Aug. 11, 2014

(87) PCT Pub. No.: WO2013/117279
PCT Pub. Date: Aug. 15, 2013

(65) Prior Publication Data
US 2015/0100225 A1 Apr. 9, 2015

(30) Foreign Application Priority Data
Feb. 10, 2012 (DE) .......................... 10 2012 201 982

(51) Int. Cl.
*G06F 19/00* (2011.01)
*G08G 1/00* (2006.01)
*G08G 1/0967* (2006.01)
*G08G 1/16* (2006.01)
*G01C 21/34* (2006.01)
*G06Q 50/00* (2012.01)

(52) U.S. Cl.
CPC .............. *G08G 1/22* (2013.01); *G01C 21/3415* (2013.01); *G06Q 50/01* (2013.01); *G08G 1/096716* (2013.01); *G08G 1/096725* (2013.01); *G08G 1/096775* (2013.01); *G08G 1/096783* (2013.01); *G08G 1/164* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,097,313 | A * | 8/2000 | Takahashi et al. | 340/905 |
| 8,831,820 | B2 * | 9/2014 | Sato | 701/31.4 |
| 8,989,995 | B2 * | 3/2015 | Shida | 701/117 |
| 2010/0060482 | A1 | 3/2010 | Emam et al. | |
| 2014/0303870 | A1 * | 10/2014 | Switkes et al. | 701/96 |

FOREIGN PATENT DOCUMENTS

| | | |
|---|---|---|
| DE | 10131839 | 1/2003 |
| DE | 10348635 | 5/2005 |
| WO | WO2011/013216 | 2/2011 |

OTHER PUBLICATIONS

International Search Report for PCT/EP2012/075769, issued on Mar. 21, 2013.

* cited by examiner

*Primary Examiner* — Thomas Tarcza
*Assistant Examiner* — Edward Pipala
(74) *Attorney, Agent, or Firm* — Kenyon & Kenyon LLP

(57) ABSTRACT

A method for navigation by road users in the area of a traffic congestion, includes the steps of determining a group of road users in the area of the traffic congestion, who are users of a predetermined service, the capturing of travel data of the members of the group, the determining of driving maneuvers for the members of the group based on the captured driving data and the outputting the driving maneuvers to the associated members of the group. The driving maneuvers are coordinated with one another, in order to reduce the effects of the traffic congestion for the members of the group.

16 Claims, 3 Drawing Sheets

METHOD AND DEVICE FOR COOPERATIVELY BASED NAVIGATION

BACKGROUND INFORMATION

Different navigation systems are known for the navigation by road users from a current position to a specified destination position. In them, the present position of the road user is usually determined and, based on the traffic resistances on sections of the road network on which the road user is located, as advantageous a route as possible is determined and output for the road user. For the determination of the route, current traffic data, for instance, with respect to a temporary traffic obstacle, may also be processed. The road user usually includes a motor vehicle, particularly a passenger car.

A determination device for determining the routs may be provided onboard the motor vehicle or at a central location. In the first case, the current traffic data may be transmitted to the road user in a wireless manner, and in the latter case, the acquisition of current traffic data may take place in any desired manner, and transmission between the road user and the central determination device usually takes place in a wireless manner.

If a traffic interference occurs, the traffic flow in the region of the traffic interference is usually difficult to predict. In particular, the traffic volume in the small and smallest space about the traffic congestion may be affected by the individual decisions of the drivers of the motor vehicles affected by the traffic congestion, it being unknown what information base these drivers have available to them.

SUMMARY

It is therefore an object of the present invention to provide a method and a device for cooperatively based navigation.

A method according to the present invention, for navigation by road users in a region of a traffic congestion, includes the steps of determining a group of road users in the area of the traffic congestion, who are users of a predetermined service, the capturing of travel data of the members of the group, the determining of driving maneuvers for the members of the group based on the captured driving data and outputting the driving maneuvers to the associated members of the group. In this context, the driving maneuvers determined are coordinated with one another, in order to reduce the effects of the traffic congestion for the members of the group.

The users of the predetermined service, who form a virtual group, so to speak, are able to form a real group in the manner described, whose driving maneuvers are coordinated with one another within the meaning of a collective advantage. It is known that the overall usefulness for all members of a group, in the case of group-oriented actions of each individual member is generally greater than in the case of individually based actions of each member. The members of the group may be instructed to solve the problem of the traffic congestion in the best manner possible, for all the members of the group. The average obstruction may thereby be reduced for each member of the group. A positive effect may also be output to road users that are not members of the group. An overall traffic load may thereby be reduced in the area of the traffic congestion.

In one preferred specific embodiment, the driving maneuvers are determined so that driving speeds of the members of the group are made to approach one another. A repeated accelerating and decelerating of the members of the group, which is able to result in unnecessary energy consumption, may thereby be prevented. In particular, a calming effect may start on all traffic users in the area of the traffic congestion, so that an increased average speed of the road users is able to set in at the lowest deviation from average.

The driving maneuvers may also be determined so that the distances between the members of the group are reduced to a predetermined maximum distance. Thereby, the group is not able to exceed a predetermined magnitude along a road. It may be simpler, thereby, to coordinate with one another the driving maneuvers of the members of the group. In addition, the road users who are not users of the predetermined service, may be squeezed out in this manner from the really formed group, whereby the real group may be easier to influence.

Besides the influencing of a driving speed and an acceleration or deceleration of the members of the group, other maneuvers, such as lane change or a turning-off process, perhaps for utilizing an avoidance path or for little group-wise passing, may also be coordinated among the members of the group.

In one particularly preferred specific embodiment, the predetermined service includes a social network. The social network may be provided particularly for group-based traffic management. A clear additional usefulness may be allocated to users of this network in the manner described. Such a network is known by the name WAZE. Such a network may obtain its data and information, on the basis of which navigation solutions are determined for users, from the users during their utilization of the service, The determination of the driving maneuvers may be carried out by a device separate from the road users. In particular, the determination may be made by a central entity or by a central service. The central service may be cloud-based, so that it is immaterial at which specific locality an executional entity is situated. Communication expenditure between the members of the group may be minimized by the central determination. Particularly, for n members, communication between n x n members may be avoided. Thereby, an available bandwidth may be saved and the speed of execution of the method may be increased.

The driving maneuvers may be determined in such a way that, in the area of a lane narrowing, the members of the group are guided from the affected lane according to the manner of a zipper. The zipper method that is usual in the case of lane narrowing, and whose execution frequently leads to differences of opinion between the road users, may thereby be executed in an improved manner. Traffic flow is able to be speeded up thereby and coordinating difficulties between the road users reduced.

In one specific embodiment, one of the road users includes a motor vehicle, and the driving maneuvers are output in such a way that the motor vehicle automatically initiates the driving maneuvers. This may take place, in particular, in connection with an existing assistant for supporting the driver. The assistant may include, for example, a speed assistant having optional range spacing or a lane assistant, which are able to intervene actively in the driving behavior of the motor vehicle. The expenditure for implementing the method may be lowered by this integration. In addition, because of the integration with an existing assistant, the acceptance by the driver of the motor vehicle may be increased with respect to the method described.

In one specific embodiment, it may be determined that the number of members of the group exceeds a predetermined value, and the members may be assigned to subgroups that are independent of one another, the method continuing in each case to be carried out on the subgroups. Consequently, the growth of the number of members to a number that can no longer be handled efficiently is able to be avoided. The groups created may be guided individually through the area of the traffic congestion, whereby a mutually negative effect of the road users is able to be avoided.

One member of the group, whose driving speed exceeds a predetermined value, may be discharged from the group. By this procedure the entire group may, in the final analysis, be dissolved as soon as the traffic congestion is no longer present.

A computer program product has program code means for carrying out the method described when it is run on a processing device or is stored on a computer-readable data carrier. Using the computer program product, a navigation device onboard a motor vehicle may be put in a position of carrying out the method described.

A device for navigation by a road user in the area of a traffic congestion includes a determination device for determining that the road user is a user of a predetermined service, and for the assignment of the road user to a group of such road users, a capturing unit for capturing driving data of the road user, a determination device for determining driving maneuvers coordinated with one another for the members of the group, based on the captured driving data, in order to reduce the effects of the traffic congestion for the members of the group, and an output device for the output of the driving maneuver determined for the road user to the road user.

DETAILED DESCRIPTION

Figure 1:
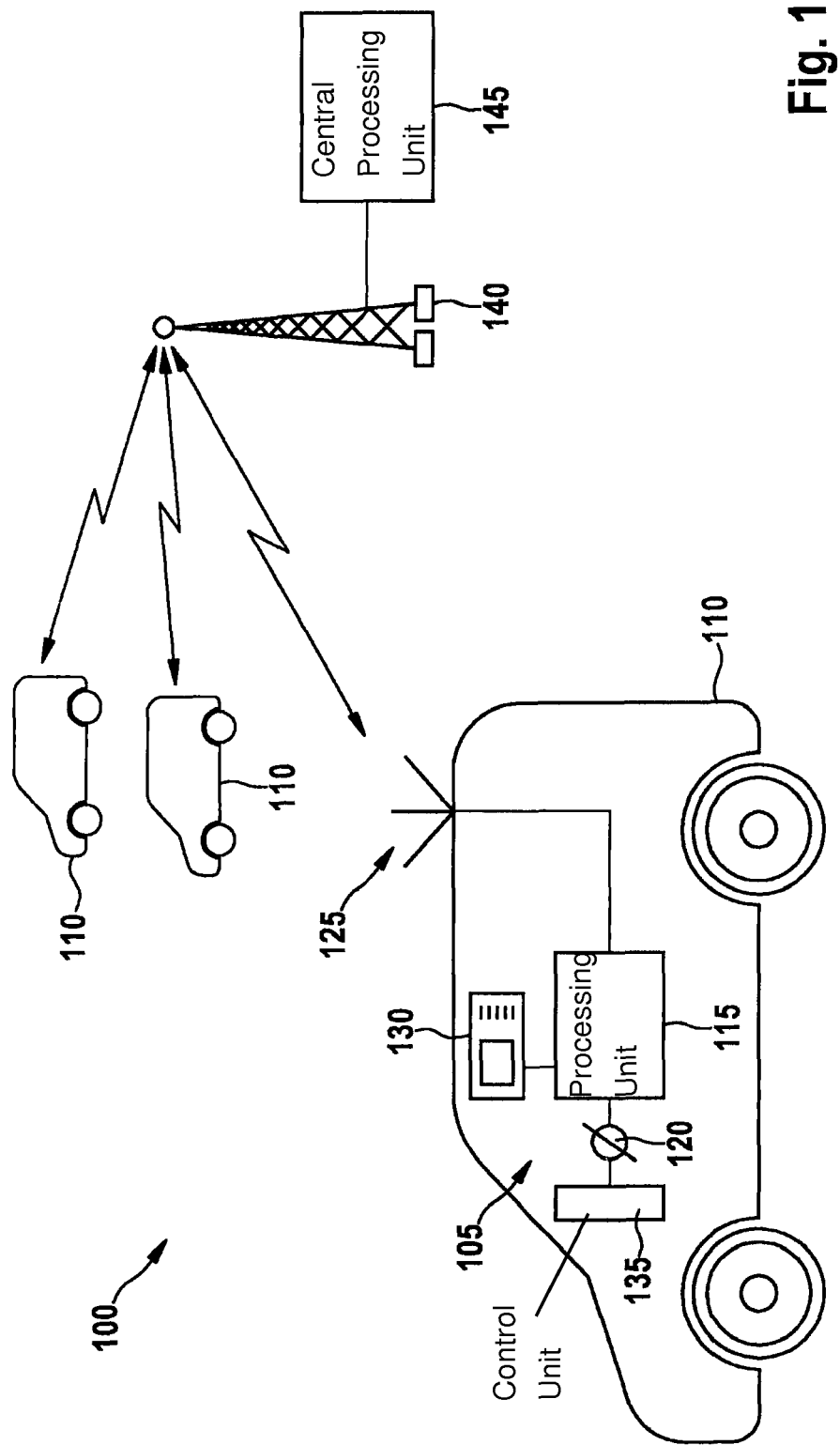
FIG. 1 shows a device and a system for a cooperatively based navigation.

FIG. 1 shows a system 100 and a device 105 for cooperatively based or group-based navigation.

Device 105 is applied onboard a motor vehicle 110. Device 105 includes a processing unit 115, an interface 120, a communication unit 125 and a user interface 130. Processing unit 115 is connected to interface 120, communication unit 125 and user interface 130. Interface 120 leads to a control unit 135 of vehicle 110.

In one specific embodiment, control unit 135 is equipped to provide, via interface 120, driving data of motor vehicle 110, particularly a current position, a speed, an acceleration, a destination or an impending driving maneuver. In this context, control unit 135 may include a navigation system, particularly a satellite navigation system. In one specific embodiment, processing unit 115 and control unit 135 may also be integrated or even be coincident.

Control unit 135 may be designed to accept commands via interface 120, and to influence the motion of motor vehicle 110 directly, as a function of the commands. The influencing may particularly relate to a speed, and acceleration or deceleration or a directional steering of motor vehicle 110. In one specific embodiment, two control units 135 are provided, control unit 135 for providing driving data being executed separately from control unit 135 for picking up commands. In another specific embodiment, processing unit 115 and one of the two control units 135 may be integrated or even be coincident.

User interface 130 may have any optional, usual elements for interaction with a user, particularly an optical, acoustical or haptic input or output. The user is normally a driver of motor vehicle 110. Processing unit 115 may be designed to carry out an output via an interface 120 and/or user interface 130.

System 100 includes a plurality of motor vehicles 110, which are each equipped with a device 105, a communication system 140 for wireless communication with communication units 125, as well as a central processing unit 145. Central processing unit 145 may be replaced by a service in a network, especially by a cloud-based service. Although basically any motor vehicles 110 are able to communicate with the central communication system 140, it is advantageous to utilize actualities of communication system 140 in order to address in common specifically those motor vehicles 110 which are located close to one another. Communication device 140 may include, for instance, a radio cell of a cell-based telephone network, and motor vehicles 110 are able to stay within the radio cell.

Central communication system 140 together with central processing unit 145 may be designed for exchanging data, particularly driving data, between motor vehicles 110. In this case, onboard of each individual motor vehicle 110, using processing unit 115, a driving maneuvers for guiding motor vehicle 110 may be determined based on the driving data of the other motor vehicles 110.

In another specific embodiment, the determinations of the driving maneuvers are carried out centrally for all motor vehicles 110 by processing unit 145.

Figure 2:
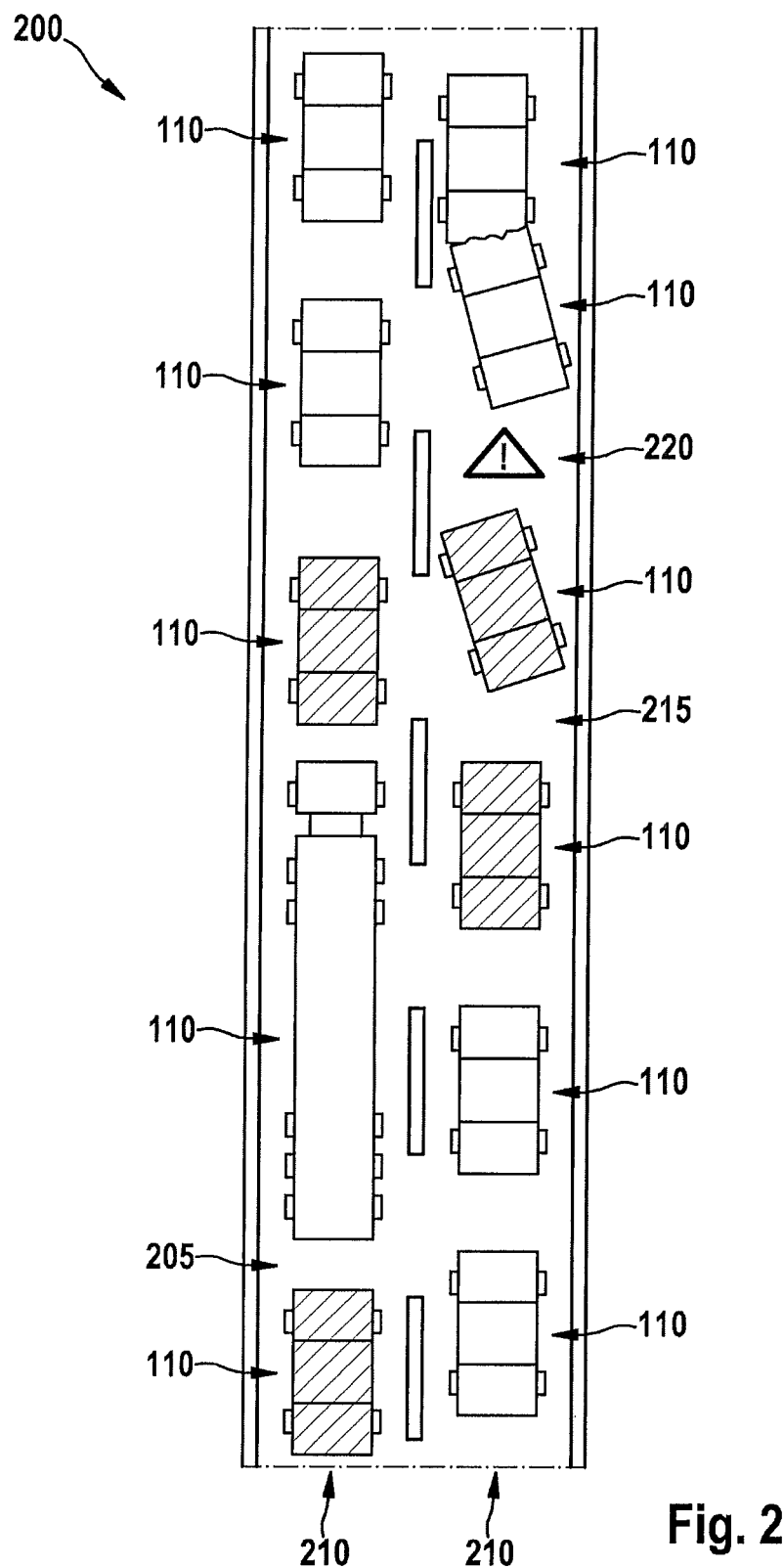
FIG. 2 shows a traffic situation for explaining the cooperatively based navigation.

FIG. 2 shows a traffic situation 200 for explaining the cooperatively based navigation, which is able to be carried out using device 105 and system 100 of FIG. 1. A plurality of motor vehicles 110 is located on a road 205 having two lanes 210. In this instance, motor vehicles 110, that are shown shaded, are members of a group 200. There is a traffic congestion 220 in the upper area of the right lane 210, where two motor vehicles 110 are unable to be driven after an accident. Motor vehicles 110 of group 215 are receiving information on driving maneuvers, the driving maneuvers being coordinated with one another in such a way that the removal of motor vehicles 110 of group 215 past traffic congestion 220 is collectively improved. For this purpose, the driving maneuvers are coordinated with one another on the basis of driving data of the individual motor vehicles 110 of group 215. The determination of the driving maneuvers was explained above with reference to FIG. 1.

The driving maneuvers may, for instance, be determined so that motor vehicles 110, which are members of group 215, travel as directly one behind the other or next to one another. In one specific embodiment, motor vehicles 110, that travel directly as neighbors, may be regarded in principle as a single, large motor vehicle 110, which is navigated over road 205. However, other methods of behavior are possible as well. For example, guiding together the traffic flows of the two lanes 210 in the area of traffic congestion 220 according to the zipper principle may be carried out more easily if the members of group 215 travel as nearly as possible directly next to each other or in front of each other before traffic congestion 220.

In order to hold group 215 to as closed as possible, a series of driving maneuvers may be suggested, for example, to a member 110 that is at a distance from the rest of group 215, for example, as is shown at the bottom, left, which bring this motor vehicle 110 closer to the rest of the group.

Figure 3:
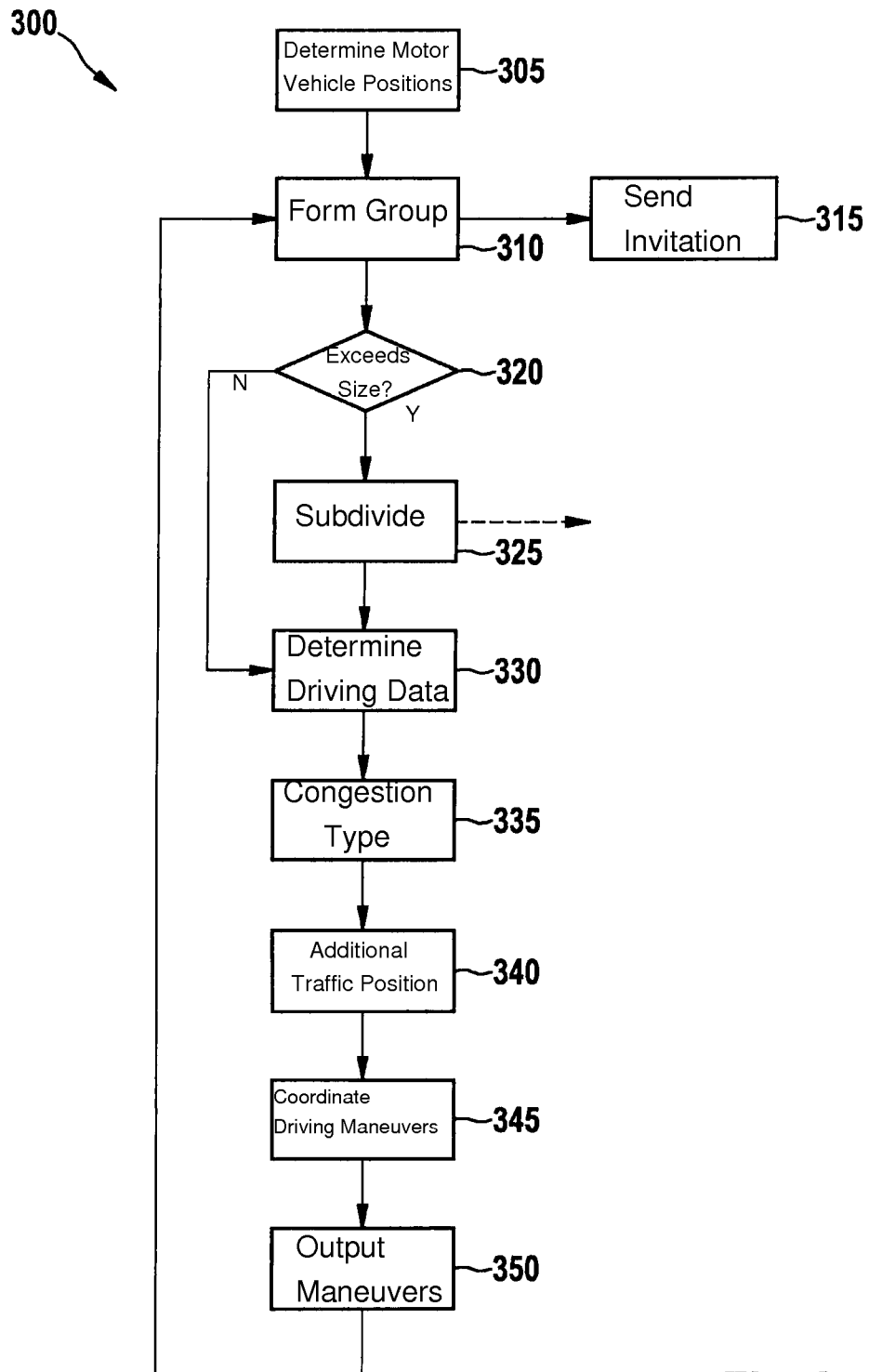
FIG. 3 shows a flow chart of a method for the cooperatively based navigation.

FIG. 3 shows a flow chart of a method 300 for a cooperatively based navigation, as was explained above with respect to FIGS. 1 and 2. In this context, method 300 may be carried out on a central processing unit 145 or, in a distributed manner, on a plurality of processing units 115 onboard of a plurality of motor vehicles 110.

In a first step 305, positions of motor vehicles 110, which are members of a group 215, are determined Group 215 is defined in that its members are located in a predetermined area of a traffic obstruction 220, and that they, or the drivers driving them are members of a social network, which preferably exists for the exchange of navigation-based data.

In a following step 310, group 215 is formed according to the criteria described. If a motor vehicle 110 which, or whose driver, is a user of the social network, is not located close enough to the rest of group 215, an invitation may be sent to this motor vehicle 110 in a step 315. The invitation may include one or more driving maneuvers for reaching the rest of group 215. For the individual motor vehicle 110, method 300 is no longer continued at this point until the vehicle may be taken up into group 215.

For the remaining members of group 215, the method continues in a step 320, in which it is determined whether the group has exceeded a predetermined size. In addition, it may be determined whether the number of members of group 215 is exceeding a predetermined value. If the group is too large, it may be subdivided into a plurality of subgroups in a step 325. Method 300 may then be embodied individually for each subgroup, the individual embodiments of method 300 being able to be carried out independently of one another.

If there is no reason for subdividing the group, or if the group has already been subdivided, in a step 330 driving data of participating motor vehicle 110 are determined These driving data may already be present in the form of the positions of participating motor vehicles 110 determined in step 305. However, the driving data include additional information, particularly speeds, accelerations, maximum speeds able to be reached or travel destinations.

It may optionally be determined in a step 335, which may also be carried out at a different time, what type of traffic congestion 220 is taking place. Furthermore, in a step 340, that is also optional, an additional traffic position in the area of traffic congestion 220 may be determined Based on the data determined, in a step 345 driving maneuvers coordinated with one another are determined for motor vehicles 110, which are users of group 215. Subsequently, the driving maneuvers are output to individual motor vehicles 110 in a step 350, each motor vehicle 110 preferably receiving only that particular driving maneuver which has been determined for this motor vehicle 110.

What is claimed is:

1. A method for navigation in an area of a traffic congestion, comprising:
    capturing driving data of at least a subset of members of a group of road users in the area of the traffic congestion who are users of a predetermined service, the subset including a plurality of the members, and the capturing being performed based on the usage of the service by the members of the group;
    determining driving maneuvers for the at least the subset of the members of the group based on the captured driving data;
    outputting the driving maneuvers to respective ones of the at least the subset of the members of the group;
    wherein:
        the determining of the driving maneuvers includes coordinating the driving maneuvers of the at least the subset with each other, in order to reduce effects of the traffic congestion for the at least the subset of members of the group; and
    at least one of:
        the coordinating includes selecting a driving maneuver for a first one of the members based on the driving data of a second one of the members that is not directly in front of the first member and not directly behind the first member; and
        the capturing of the driving data is performed by a central processing unit, the determining of the driving maneuvers is performed by the central processing unit and for all of the at least the subset of the members, and the outputting of the driving maneuvers is performed by the central processing unit using wireless communication.

2. The method as recited in claim 1, wherein the driving maneuvers are determined in such a way that driving speeds of the at least the subset of the members of the group are approximated to one another.

3. The method as recited in claim 1, wherein the driving maneuvers are determined so that distances between the at least the subset of the members of the group are reduced to a predetermined maximum distance.

4. The method as recited in claim 1, wherein the predetermined service includes a social network.

5. The method as recited in claim 4, wherein the predetermined service includes a social network for the group-based traffic guidance.

6. The method as recited in claim 1, wherein the determination of the driving maneuvers is carried out by a separate device that is separate from the road users.

7. The method as recited in claim 6, wherein the driving maneuvers are determined by a distributed determination service.

8. The method as recited in claim 1, wherein the driving maneuvers are determined in such a way that, in an area of a lane narrowing, the at least the subset of the members of the group are guided from an affected lane according to the manner of a zipper.

9. The method as recited in claim 1, wherein at least one of the driving maneuvers is output in such a way that a motor vehicle associated with a respective one of the at least the subset of the members automatically initiates the respective driving maneuver.

10. The method as recited in claim 1, further comprising:
    determining that the number of members of the group exceeds a predetermined value;
    assigning the members to subgroups that are independent of one another; and
    independently determining driving maneuvers for each of the subgroups.

11. The method as recited in claim 1, wherein a member, whose driving speed exceeds a predetermined value, is dismissed from inclusion in the at least the subset.

12. The method as recited in claim 1, wherein the coordinating includes the selecting of the driving maneuver for the first one of the members based on the driving data of the second one of the members that is not directly in front of the first member and not directly behind the first member.

13. The method as recited in claim 1, wherein the capturing of the driving data is performed by the central processing unit, the determining of the driving maneuvers is performed by the central processing unit and for all of the at least the subset of the members, and the outputting of the driving maneuvers is performed by the central processing unit using the wireless communication.

14. The method as recited in claim 13, wherein the coordinating includes the selecting of the driving maneuver for the first one of the members based on the driving data of the second one of the members that is not directly in front of the first member and not directly behind the first member.

15. A non-transitory computer-readable medium on which is stored program code that is executable by a central processing device and that, when executed by the processing device, causes the processing device to perform a method for navigation in an area of a traffic congestion, the method comprising:

capturing driving data of at least a subset of members of a group of road users in the area of the traffic congestion who are users of a predetermined service, the subset including a plurality of the members, and the capturing being performed based on the usage of the service by the members of the group;

determining driving maneuvers for all of the at least the subset of the members of the group based on the captured driving data;

using wireless communication, outputting the driving maneuvers to respective ones of the at least the subset of the members of the group;

wherein the determining of the driving maneuvers includes coordinating the driving maneuvers of the at least the subset with each other, in order to reduce effects of the traffic congestion for the at least the subset of members of the group.

16. A central processing device for a navigation of a road user in an area of a traffic congestion, comprising:

a capturing interface for capturing driving data of at least a subset of members of a group of road users in the area of the traffic congestion who are users of a predetermined service, the subset including a plurality of the members, and the capturing being performed based on the usage of the service by the members of the group;

processing circuitry coupled to the capturing interface, wherein the processing circuitry is configured to determine driving maneuvers for all of the at least the subset of the members of the group based on the captured driving data, wherein the determination of the driving maneuvers includes coordinating the driving maneuvers of the at least the subset with each other, in order to reduce effects of the traffic congestion for the at least the subset of members of the group; and an output device for outputting the driving maneuvers via wireless communication to respective ones of the at least the subset of the members of the group.

* * * * *